United States Patent [19]
Yoshimura

[11] Patent Number: 4,630,076
[45] Date of Patent: Dec. 16, 1986

[54] INK-ON-DEMAND COLOR INK JET SYSTEM PRINTER

[75] Inventor: Hisashi Yoshimura, Kyoto, Japan

[73] Assignee: Sharp Kabushiki Kaisha, Osaka, Japan

[21] Appl. No.: 561,793

[22] Filed: Dec. 15, 1983

[30] Foreign Application Priority Data

Dec. 23, 1982 [JP] Japan ................................ 57-232219

[51] Int. Cl.⁴ ......................... G01D 15/18; H04N 1/46
[52] U.S. Cl. .................................. 346/140 R; 346/1.1; 358/75
[58] Field of Search .............. 346/140 PD, 1; 358/75, 358/80

[56] References Cited

U.S. PATENT DOCUMENTS 4,412,225 10/1983 Yoshida et al. ...................... 346/1.1
4,446,470 5/1984 Sugiyama et al. ............ 346/140 PD

FOREIGN PATENT DOCUMENTS 42858 3/1980 Japan ............................. 346/140 PD
142658 11/1980 Japan ............................. 346/140 PD
142662 11/1980 Japan ............................. 346/140 PD Primary Examiner—George H. Miller, Jr.
Attorney, Agent, or Firm—Birch, Stewart, Kolasch & Birch

[57] ABSTRACT

A color ink jet system printer of the ink-on-demand type includes four orifices for emitting yellow ink droplets, magenta ink droplets, cyan ink droplets and black ink droplets, and an additional orifice for emitting white or transparent ink droplets. The white or transparent ink droplets are emitted in the thinned printing mode in a manner that the white or transparent ink droplets overlap on printed dots printed by the yellow, magenta, cyan and/or black ink droplets. By overlapping the white or transparent ink droplets on the previously printed dots, the previously printed dots bleed to provide a light tone image.

4 Claims, 8 Drawing Figures

INK-ON-DEMAND COLOR INK JET SYSTEM PRINTER

BACKGROUND AND SUMMARY OF THE INVENTION

The present invention relates to a printer for printing a color image and, more particularly, to an ink jet system printer of the ink-on-demand type for printing a color image.

Generally, in a color printer, various colors are formed by mixing three primary colors, yellow, magenta and cyan. A color ink jet system printer has been proposed, wherein the above-mentioned three color ink droplets and a black ink droplet are mixed on a record receiving paper.

An example of the color ink jet system printer of the ink-on-demand type is disclosed in copending application, COLOR INK JET SYSTEM PRINTER, Ser. No. 488,827, filed on Apr. 26, 1983 by Yoshio Kanayama and assigned to the same assignee as the present application, wherein a yellow orifice, magenta orifice, cyan orifice and black orifice are provided on a printer head for printing a multi-color image.

However, the conventional color ink jet system printer of the ink-on-demand type does not ensure a clean printing in the gradation printing operation. Generally, a thinned out printing is conducted to achieve the gradation printing. The thinned out printing in the conventional color ink jet system printer of the ink-on-demand type increases the color contrast between the printing position and the non-printing, thinned out position. Thus, a light color printing is not produced in the conventional color ink jet system printer of the ink-on-demand type.

Accordingly, an object of the present invention is to provide a color ink jet system printer of the ink-on-demand type, which ensures a clean printing even in the thinned out printing mode.

Another object of the present invention is to provide a color ink jet system printer of the ink-on-demand type, which produces a light color image.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a white orifice is formed in the printer head in addition to the yellow orifice, magenta orifice, cyan orifice and the black orifice. When the thinned out printing operation is conducted, a white ink droplet is emitted from the white orifice for overlapping the white ink droplet on the yellow, magenta, cyan and/or black ink dropltes. The white ink droplet is mixed with the yellow, magenta, cyan and/or black ink droplets to provide the bleeding, thereby producing a light color printing. Transparent ink can be used instead of the white ink.

BRIEF DESCRIPTION OF THE DRAWINGS

The present invention will be better understood from the detailed description given hereinbelow and the accompanying drawings which are given by way of illustration only, and thus are not limitative of the present invention and wherein.

DESCRIPTION OF THE PREFERRED EMBODIMENTS

Figure 1:
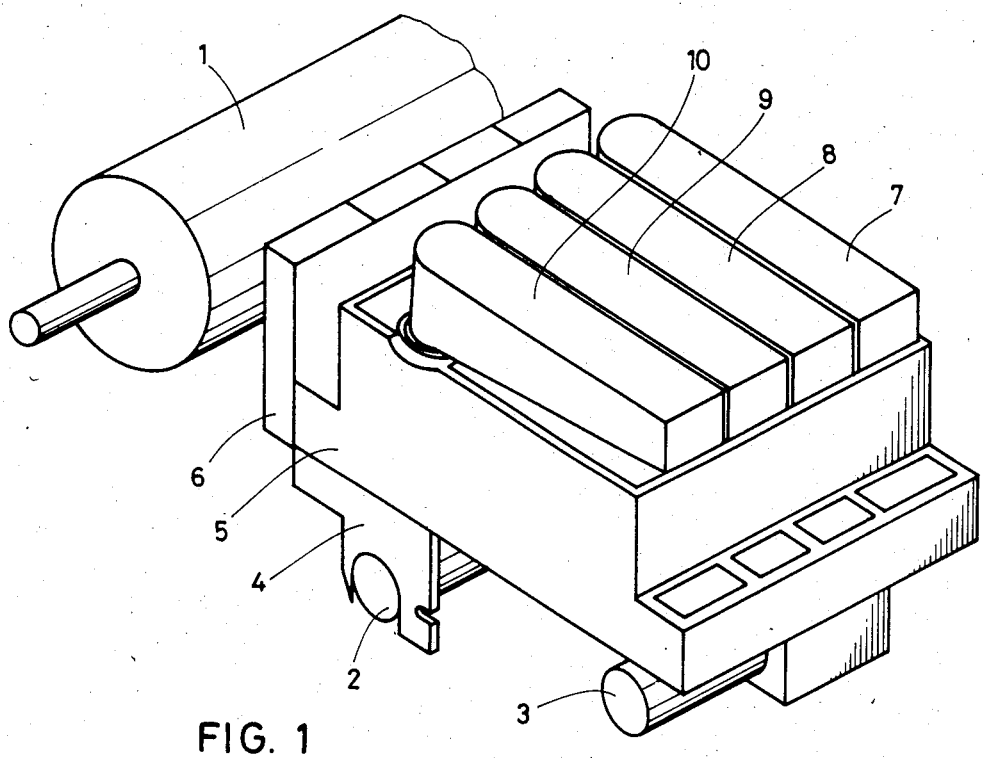
FIG. 1 is a schematic perspective view of a color ink jet system printer of the ink-on-demand type of the prior art.

FIG. 1 schematically shows a color ink jet system printer of the ink-on-demand type of the prior art, which includes a platen 1, and a pair of shafts 2 and 3 disposed along the platen 1. A carriage 4 is slidably mounted on the shafts 2 and 3 so that the carriage 4 is slidable along the platen 1 in the lateral direction. The carriage 4 is connected to a drive mechanism including a pulse motor via a wire, whereby the carriage 4 is driven to travel in the lateral direction by the pulse motor. The actual printing operation is conducted while the carriage 4 travels rightwards in FIG. 1.

Four ink reservoirs 5 containing different four color ink, respectively, are mounted on the carriage 4. A printer head 6 is mounted on the carriage 4 in a manner that the printer head 6 confronts the platen 1 and communicates with the four ink reservoirs 5. Four ink cartridges 7, 8, 9 and 10 are mounted on the four ink reservoirs 5. The ink cartridge 7 contains yellow ink, the ink cartridge 8 contains magenta ink, the ink cartridge 9 contains cyan ink, and the ink cartridge 10 contains black ink.

Figure 2:
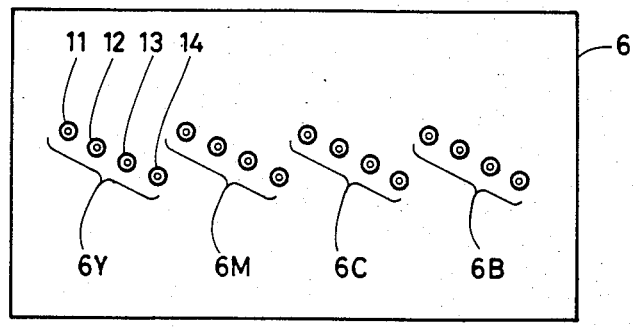
FIG. 2 is a schematic front view of a printer head included in the color ink jet system printer of the ink-on-demand type of FIG. 1.

FIG. 2 is a front view of the printer head 6 included in the color ink jet system printer of the ink-on-demand type of the prior art shown in FIG. 1. An arrow in FIG. 2 represents the travel direction of the carriage 4 when the actual printing operation is conducted. The printer head 6 includes four yellow orifices 6Y, four magenta orifices 6M, four cyan orifices 6C, and four black orifices 6B. Orifices 11, 12, 13 and 14 for each color are disposed in a manner to incline as shown in FIG. 2. The distance between the two adjacent orifices in the vertical direction corresponds to one dot position. That is, the printer head 6 is designed to print four lines simultaneously. The distance between the two adjacent orifices in the lateral direction corresponds to the length of eight dot positions. The corresponding orifices of the respective color are located at the same line.

Figure 3A:
FIGS. 3(A) through 3(C) are plan views for explaining a thinned out printing operation conducted by the color ink jet system printer of the ink-on-demand type of FIG. 1.
Figure 3B:
Figure 3C:

To achieve the gradation printing, it has been proposed to thin out the printing dot in the color ink jet system printer of the type discussed above. More specifically, FIG. 3(A) shows a deep tone printing wherein the full number ink droplets are deposited on the record receiving paper. FIG. 3(B) shows a half tone printing wherein a half of ink droplets are thinned out to print the half tone. FIG. 3(C) shows a light tone printing wherein further ink droplets are thinned out to print the light tone.

In the thinned out printing mode, the color contrast becomes strong as the printing dots become few in the conventional color ink jet system printer. Therefore, the conventional color ink jet system printer is not suited for printing the light color image.

The present invention is to provide a color ink jet system printer which ensures light tone representation in the thinned out printing mode.

Figure 4:
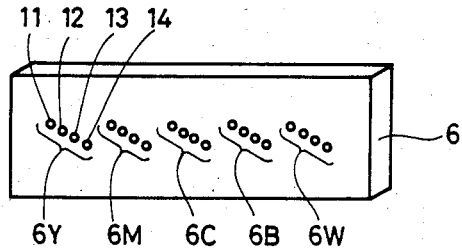
FIG. 4 is a schematic front view of a printer head included in an embodiment of a color ink jet system printer of the ink-on-demand type of the present invention.

FIG. 4 shows an embodiment of a printer head included in a color ink jet system printer of the ink-on-demand type of the present invention. Like elements corresponding to those of FIG. 2 are indicated by like numerals.

In addition to the four yellow orifices 6Y, four magenta orifices 6M, four cyan orifices 6C and four black orifices 6B, four white orifices 6W are provided for emitting white ink droplets or transparent ink droplets. The distance between two orifices 11 and 12 (12 and 13; 13 and 14) in the vertical direction corresponds to one dot position. That is, the printer head 6 is designed to print four lines at a same time. The uppermost orifice in the yellow orifices 6Y (11) is separated from the uppermost orifice in the magenta orifices 6M by a distance corresponding to the length of eight dot positions. The corresponding orifices of the respective color are located on the same line. As in the case of the color ink jet system printer of FIG. 1, the yellow orifices 6Y are connected to a yellow ink tank which is communicated with the yellow ink cartridge 7, the magenta orifices 6M are connected to a magenta ink tank which is communicated with the magenta ink cartridge 8, the cyan orifices 6C are connected to a cyan ink tank which is communicated with the cyan ink cartridge 9, the black orifices 6B are connected to a black ink tank which is communicated with the black ink cartridge 10, and the white orifices 6W are connected to an ink tank which contains white ink or transparent ink, the ink tank being communicated with an ink cartridge which contains white ink or transparent ink. The printer head 6, the ink tanks, and the ink cartridges are mounted on the carriage 4.

When the thinned out printing operation is conducted, the white ink droplets or the transparent ink droplets are emitted from the white orifices 6W so that the white ink droplets or the transparent ink droplets overlap on the previously printed yellow dots, magenta dots, cyan dots and/or black dots.

Figure 5A:
FIGS. 5(A) and 5(B) are plan views for explaining a thinned out printing operation conducted by the color ink jet system printer of the ink-on-demand type of the present invention.

FIG. 5(A) shows a half tone printing mode conducted by the color ink jet system printer of the present invention. A half of ink droplets are thinned out as in the case of FIG. 3(B). The white or transparent ink droplets are deposited on the printed dots in a manner that one white or transparent ink droplet is deposited on the respective printed dots. By overlapping the white or transparent ink droplet on the printed dot, the printed dot bleeds to enlarge the dot size, thereby producing the light color image.

Figure 5B:

FIG. 5(B) shows a light tone printing mode conducted by the color ink jet system printer of the present invention. Further ink droplets are thinned out as in the case of the printing operation of FIG. 3(C). The white or transparent ink droplets are deposited on the printed dots in a manner that two white or transparent ink droplets are deposited on the respective printed dots. The overlapped white or transparent ink droplets function to provide bleeding printed dots, thereby producing the light color image.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A color ink jet system printer comprising:
   a carriage;
   a record receiving member; and
   shift means for shifting at least one of said carriage and record receiving member in the lateral direction while the actual printing operation is conducted, said carriage comprising:
      a printer head including at least four orifices for emitting ink droplets of three primary colors and white ink droplets, said at least four orifices being aligned in said lateral direction with a predetermined distance therebetween;
      ink liquid supply means for supplying ink liquid of said three primary colors and white ink liquid to said at least four orifices, respectively;
   said four orifices are aligned in an order so that said white ink droplets are deposited on printed dots on said record receiving member printed by at least one of said ink droplets of three primary colors; and
   said at least four orifices providing means for depositing the ink droplets in a manner so that the printed dots are enlarged in size by bleeding and thereby produce a light color image.

2. A color ink jet system printer comprising:
   a carriage;
   a record receiving member; and
   shift means for shifting at least one of said carriage and record receiving member in the lateral direction while the actual printing operation is conducted, said carriage comprising:
      a printer head including at least four orifices for emitting ink droplets of three primary colors and transparent ink droplets, said at least four orifices being aligned in said lateral direction with a predetermined distance therebetween;
      ink liquid supply means for supplying ink liquid of said three primary colors and transparent ink liquid to said at least four orifices, respectively;
   said at least four orifices are aligned in such an order that said transparent ink droplets are deposited on printed dots on said record receiving member printed by at least one of said ink droplets of three primary colors; and
   said at least four orifices providing means for depositing the ink droplets in a manner so that the printed dots are enlarged in size by bleeding and thereby produce a light color image.

3. An ink-jet color printing method for forming a color picture in the form of dot patterns with ink dots of a plurality of colors on a recording medium, comprising the following steps:
   depositing ink droplets of primary colors on a record receiving member to form printed dots,
   depositing a further ink droplet of white ink on at least one of said printed dots formed by said ink droplets of primary colors so that the printed dot bleeds to enlarge the dot size and thereby produce a light color image.

4. An ink-jet color printing method for forming a color picture in the form of dot patterns with ink dots of a plurality of colors on a recording medium, comprising the following steps:
   depositing ink droplets of primary colors on a record receiving member to form printed dots,
   depositing a further ink droplet of transparent ink on at least one of said printed dots formed by said ink droplets of primary colors so that the printed dot bleeds to enlarge the dot size and thereby produce a light color image.

* * * * *